United States Patent
Oprisch et al.

(10) Patent No.: US 12,390,750 B2
(45) Date of Patent: Aug. 19, 2025

(54) FILTER DEVICE HAVING A FILTER ELEMENT

(71) Applicant: MANN+HUMMEL GmbH, Ludwigsburg (DE)

(72) Inventors: Christine Oprisch, Oberriexingen (DE); Jochen Fuellemann, Ludwigsburg (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 330 days.

(21) Appl. No.: 18/067,881

(22) Filed: Dec. 19, 2022

(65) Prior Publication Data

US 2023/0119622 A1   Apr. 20, 2023

Related U.S. Application Data

(63) Continuation of application No. PCT/EP2020/087399, filed on Dec. 21, 2020.

(30) Foreign Application Priority Data

Jun. 26, 2020 (EP) ..................................... 20182427

(51) Int. Cl.
*B01D 35/30* (2006.01)

(52) U.S. Cl.
CPC .......... *B01D 35/30* (2013.01); *B01D 2201/30* (2013.01); *B01D 2201/31* (2013.01)

(58) Field of Classification Search
CPC ........................... B01D 35/30; B01D 2201/30; B01D 2201/31; B01D 29/925; B01D 2201/295;

(Continued)

(56) References Cited

U.S. PATENT DOCUMENTS

| 5,876,600 A | 3/1999 | Matsubara et al. |
| 10,773,193 B2 | 9/2020 | Goedecke et al. |

(Continued)

FOREIGN PATENT DOCUMENTS

| CN | 203469638 U | 3/2014 |
| DE | 102017011232 A1 | 6/2018 |

(Continued)

OTHER PUBLICATIONS

Office Action in corresponding Chinese Appln. No. 202080102381.8, Apr. 19, 2025, 48 pages, China.

*Primary Examiner* — Waqaas Ali

(57) ABSTRACT

A filter device is provided with a filter element for filtering a fluid. The filter element has a filter medium body with an end plate arranged at an end face of the filter medium body in relation to a longitudinal axis of the filter medium body. A filter base housing receives the filter element. An assembly component for assembly and disassembly of the filter element in the filter base housing is connectable to the end plate and to the filter base housing by rotation about the longitudinal axis. The assembly component has interlocking elements. An interlocking counter element is arranged at the end plate. The interlocking elements can be brought into axial interlocking connection with the interlocking counter element, while enabling a free rotatability in rotational direction about the longitudinal axis. The interlocking counter element is a circumferential interlocking collar with insertion ramps for insertion of the interlocking elements.

12 Claims, 6 Drawing Sheets

(58) Field of Classification Search
CPC ...... B01D 2201/347; B01D 2201/4007; B01D 2201/4015; B01D 2201/4053; B01D 2201/4076; B01D 29/96; B01D 29/21; B01D 17/02; B01D 17/0202; C10G 33/06; C10G 2300/208

See application file for complete search history.

(56) References Cited

U.S. PATENT DOCUMENTS

| | | |
|---|---|---|
| 11,273,395 B2 | 3/2022 | Söderström et al. |
| 2004/0154975 A1 | 8/2004 | Girondi |
| 2006/0219621 A1 | 10/2006 | Dworatzek |
| 2011/0147297 A1 | 6/2011 | Core et al. |
| 2012/0174888 A1 | 7/2012 | Pannu et al. |
| 2012/0261323 A1 | 10/2012 | Badeau et al. |
| 2013/0075319 A1 | 3/2013 | Roesgen |
| 2013/0098822 A1 | 4/2013 | Girondi |
| 2014/0061137 A1 | 3/2014 | Stamey, Jr. et al. |
| 2014/0102967 A1 | 4/2014 | Blunt et al. |
| 2014/0366494 A1 | 12/2014 | Ardes |
| 2015/0231539 A1 | 8/2015 | Hasenfratz et al. |
| 2017/0216745 A1 | 8/2017 | Girondi |
| 2017/0252682 A1 | 9/2017 | Gustafson et al. |
| 2017/0304751 A1 | 10/2017 | Zhibin |
| 2017/0361252 A1* | 12/2017 | Vogt ............... B01D 35/005 |
| 2018/0257011 A1 | 9/2018 | Bodén et al. |
| 2019/0046903 A1 | 2/2019 | Bodén et al. |
| 2021/0008472 A1 | 1/2021 | Baumann et al. |
| 2021/0170316 A1 | 6/2021 | Abdalla et al. |

FOREIGN PATENT DOCUMENTS

| | | |
|---|---|---|
| DE | 102017002119 A1 | 9/2018 |
| EP | 2201993 A1 | 6/2010 |
| JP | 2003210912 A | 7/2003 |
| WO | 16169754 A1 | 10/2016 |
| WO | 18095677 A1 | 5/2018 |
| WO | 18104416 A1 | 6/2018 |
| WO | 19142122 A1 | 7/2019 |
| WO | 19142123 A1 | 7/2019 |

* cited by examiner

FILTER DEVICE HAVING A FILTER ELEMENT

CROSS-REFERENCE TO RELATED APPLICATIONS

This application is a continuation application of international application No. PCT/EP2020/087399 having an international filing date of 21 Dec. 2020 and designating the United States, the international application claiming a priority date of 26 Jun. 2020 based on prior filed EP patent application No. EP 20182427.3, the entire contents of the aforesaid international application and the aforesaid EP patent application being incorporated herein by reference to the fullest extent permitted by the law.

BACKGROUND OF THE INVENTION

The invention relates to a filter device with a filter element for filtration of a liquid or gaseous fluid.

WO 2019/112561 A1 discloses a fuel filter with an annular filter element that is received in a filter housing with a cup-shaped filter base housing and a cover. The filter element is provided with a hollow cylindrical filter medium body whose axial end faces are covered by end plates. The filter medium body comprises an interior flow chamber which borders the clean side of the filter medium body and through which the purified fluid can be discharged axially. The cover of the filter housing can be screwed by means of a thread to the cup-shaped filter base housing; in addition, the cover is coupled in rotational direction by interlocking elements to the end plate so that, upon rotational movement of the cover, the filter element is also caused to rotate.

SUMMARY OF THE INVENTION

The invention has the object to realize with simple constructive measures a filter device with a filter element embodied as a hollow body in such a way that a damage of the filter element upon insertion into and removal out of the filter housing is avoided.

This object is solved according to the invention with a filter device with a filter element for filtration of a liquid or gaseous fluid, wherein the filter element comprises a filter medium body, which surrounds an interior flow chamber, and at least one end plate, which, in relation to a longitudinal axis of the filter medium body, is arranged at an end face thereof, with a filter base housing for receiving the filter element and with an assembly component for assembly and disassembly of the filter element in the filter base housing, wherein the assembly component is connectable to the end plate and in addition to the filter base housing by a rotational movement about the longitudinal axis, characterized in that at the assembly component at least one interlocking element is arranged, which can be brought into an axial interlocking connection with an interlocking counter element, which is arranged at the end plate or at a component at the end plate, while enabling at the same time free rotatability in rotational direction about the longitudinal axis, wherein the interlocking counter element is configured as a circumferentially extending interlocking collar in which at least one slotted guide-shaped insertion ramp is provided for insertion of the interlocking element at the assembly component.

The filter device according to the invention can be employed for filtration of a liquid or a gaseous fluid, for example, as fuel filter, as oil filter, or as air filter. The filter device comprises a filter housing with a cup-shaped filter base housing and an attachable and removable cover as well as a filter element which is insertable into the filter housing and at which the filtration of the fluid takes place. The filter element comprises a filter medium body which is embodied as a hollow body and is of a hollow cylindrical configuration and surrounds an interior flow chamber.

The filter medium body, in relation to the longitudinal axis of the filter element as well as of the filter housing, is flowed through in radial direction, usually radially from the exterior to the interior, so that the interior flow chamber receives the purified fluid which is discharged from the flow chamber in axial direction. In principle, a flow through the filter medium body in opposite direction is also possible.

The employed terms "axial" and "radial" relate to the longitudinal axis of the filter housing and of the mounted filter element inserted into the filter housing.

At least at one end face of the filter medium body, preferably at both axially oppositely positioned end faces, an end plate is positioned, respectively, which closes off the respective end face of the filter medium body in a flow-tight manner. The filter device comprises an assembly component for assembling and disassembling the filter element in the filter base housing or interacts with the assembly component. The assembly component is preferably the cover of the filter housing. As needed, an additional component which is embodied independent of the cover can be provided; in this case, a combination of filter device and assembly component is provided.

The assembly component is connectable to the end plate and additionally connectable, by a rotational movement about the longitudinal axis, to the filter base housing. Accordingly, the assembly component provides a connection between the filter element and the filter base housing. The connection of the assembly component to the end plate is realized axially—in direction of the longitudinal axis—by interlocking or friction. In rotational direction, on the other hand, the connection of the assembly component to the end plate is realized such that the connection is configured to be freely rotatable.

This embodiment has the advantage that during assembly as well as disassembly, for which a rotational movement of the assembly component is carried out respectively for connecting the filter element to the filter base housing or releasing it therefrom, the filter element does not carry out a rotational movement in the filter base housing due to the free rotatability. Upon assembly and upon disassembly, the filter element in relation to the filter base housing carries out only an axial insertion movement or removal movement. Accordingly, no or minimal forces occur between the outer wall surface of the filter element and the inner wall of the receiving filter base housing in rotational or circumferential direction. The filter element and in particular the filter medium body at the filter element are relieved correspondingly of such forces.

When the assembly component carries out a rotational movement, it carries out at the same time an axial movement relative to the filter base housing. Since the assembly component is axially fixed to the end plate and thus axially fixed to the filter element, the filter element also carries out a corresponding axial movement. This applies for the assembly as well as for the disassembly of the filter element. During the axial movement of the filter element, the latter maintains its relative rotational position in relation to the filter base housing. Due to the free rotatability between filter element and assembly component, only the assembly component, but not the filter element, carries out a rotational movement during the assembly and the disassembly.

At least one interlocking element is arranged at the assembly component and can be brought into interlocking engagement with an interlocking counter element at the end plate. The interlocking counter element is located either immediately at the end plate or at a component that is connected fixedly to the end plate or is formed as one part together with the end plate. The connection of interlocking element and interlocking counter element enables the desired interlocking connection of assembly component and filter element in axial direction and, at the same time, the free rotatability of the assembly component relative to the non-rotating filter element.

The interlocking counter element is embodied as a circumferentially extending interlocking collar in which at least one slotted guide-type insertion ramp for insertion of the interlocking element at the assembly component is provided. Advantageously, two diametrically opposed insertion ramps, by means of which a respective interlocking element at the assembly component can be brought into the interlocking position in axial direction, are provided in the interlocking collar at the radially outwardly positioned circumferential side. In the axially coupled position, the interlocking element at the assembly component is located below the interlocking collar and can move in circumferential direction along the interlocking collar. This enables the desired free rotation of the assembly component relative to the filter element with simultaneous axial coupling of assembly component and filter element.

The interlocking collar is breached by the at least one insertion ramp. Upon movement of the interlocking element in circumferential direction below the interlocking collar, the interlocking element moves axially some distance into the insertion ramp without however passing through the insertion ramp into the decoupled position. Upon further relative rotation between assembly component and filter element, the interlocking element moves out of the insertion ramp again and continues to move below the interlocking collar.

According to an advantageous embodiment, the transition of a wall section which delimits the at least one insertion ramp is rounded toward the bottom side of the interlocking collar. At the rounded portion, the interlocking element projecting into the insertion ramp can move again into the axial position below the interlocking collar with minimal force expenditure upon further relative rotation.

In a preferred embodiment, at least one insertion ramp, preferably all insertion ramps, are oriented along a straight line which is positioned at an acute angle relative to the rotation movement of the assembly component. The angle is preferably in an angle range of 30° to 60°, in particular 45°.

According to yet another advantageous embodiment, an axially projecting sleeve is integrally formed at the end plate and the interlocking counter element is formed thereat as a radially projecting interlocking collar at the sleeve. In a preferred embodiment, the sleeve forms a flow component that is connected in fluid communication with the interior flow chamber in the filter medium body. Fluid can thus flow in axial direction, in particular purified fluid axially discharged out of the interior flow chamber, by means of the sleeve.

The insertion ramp is advantageously oriented such that the assembly component for insertion of the interlocking element into the insertion ramp must carry out a release movement whereupon the interlocking element moves downwardly along the insertion ramp and assumes the axial interlocking position below the interlocking collar. Subsequently, the assembly component can be screwed by the screwing movement to the filter base housing. Upon reaching the axial interlocking position, the interlocking element remains below the interlocking collar and is supported axially at the interlocking collar without returning through the slanted insertion ramp upon relative rotation between assembly component and filter element. Only upon reversal of the relative rotational movement, the interlocking element can return via the insertion ramp, whereby the axial coupling of assembly component and filter element is canceled.

In order for a sufficiently large contact surface in the insertion ramp to be made available for safe guiding of the interlocking element, it can be advantageous that the axial extension of the radially projecting interlocking collar comprises a minimum size which is, for example, at least twice as large as the radial projection of the interlocking collar relative to the wall surface of the sleeve.

Moreover, it can be advantageous that the end face of the sleeve positioned at the top has a central recess and is slanted in the direction of the insertion ramp in order to facilitate and assist in the insertion of the interlocking element into the insertion ramp.

According to a further advantageous embodiment, the assembly component comprises an axially extending flow socket which can be attached to the sleeve. The at least one interlocking element is arranged at the wall of the flow socket. In the mounted state, the flow socket at the assembly component and the sleeve form a common, axially continuous flow path for the fluid.

According to an advantageous embodiment, the assembly component and the filter base housing are provided with threads that can be screwed into each other. Upon rotational movement during screwing in or unscrewing, the assembly component and thus also the filter element carry out an axial movement at the same time by means of the thread pitch.

In an alternative embodiment, the assembly component and the filter base housing are linked by a spiral groove extending at a slant and an interlocking element engaging the groove, wherein also in this case a rotational movement of the assembly component leads at the same time to an axial movement of assembly component and filter element.

The threads—or according to the alternative advantageous embodiment the spiral groove and the engaging interlocking element—are located advantageously at the inner wall of the filter base housing, in particular neighboring the open side of the filter base housing, and at the exterior side of the assembly component.

According to a further advantageous embodiment, at the inner wall of the filter base housing an axial guide rib is arranged. In the outer edge of a lower end plate which is neighboring the bottom of the filter base housing, a flattened portion corresponding with the axial guide rib is provided. The guide rib at the filter base housing and the flattened portion at the lower end plate enable and ensure in circumferential direction an unambiguous positioning of the filter element in the filter housing and form in addition an anti-rotation device for the filter element inserted into the filter base housing. It can be expedient to design the axial length of the guide rib such that the flattened portion at the end plate is in contact with the guide rib in the inserted state.

The invention relates also to the use of a filter element in an afore described filter device, wherein the filter element comprises a filter medium body with an interior flow chamber and at least one end plate which, in relation to a longitudinal axis of the filter medium body, is arranged at the end face thereof. The filter element comprises in addition an interlocking counter element that is arranged at the end plate or at a component at the end plate. The interlocking counter element is embodied as a circumferentially extending interlocking collar in which at least one slotted guide-type insertion ramp for insertion of an interlocking element at an assembly component is provided.

BRIEF DESCRIPTION OF THE DRAWINGS

Further advantages and expedient embodiments can be taken from the additional claims, the figure description, and the drawings.

In the Figures, same components are identified with same reference characters.

DESCRIPTION OF PREFERRED EMBODIMENTS

Figure 1:
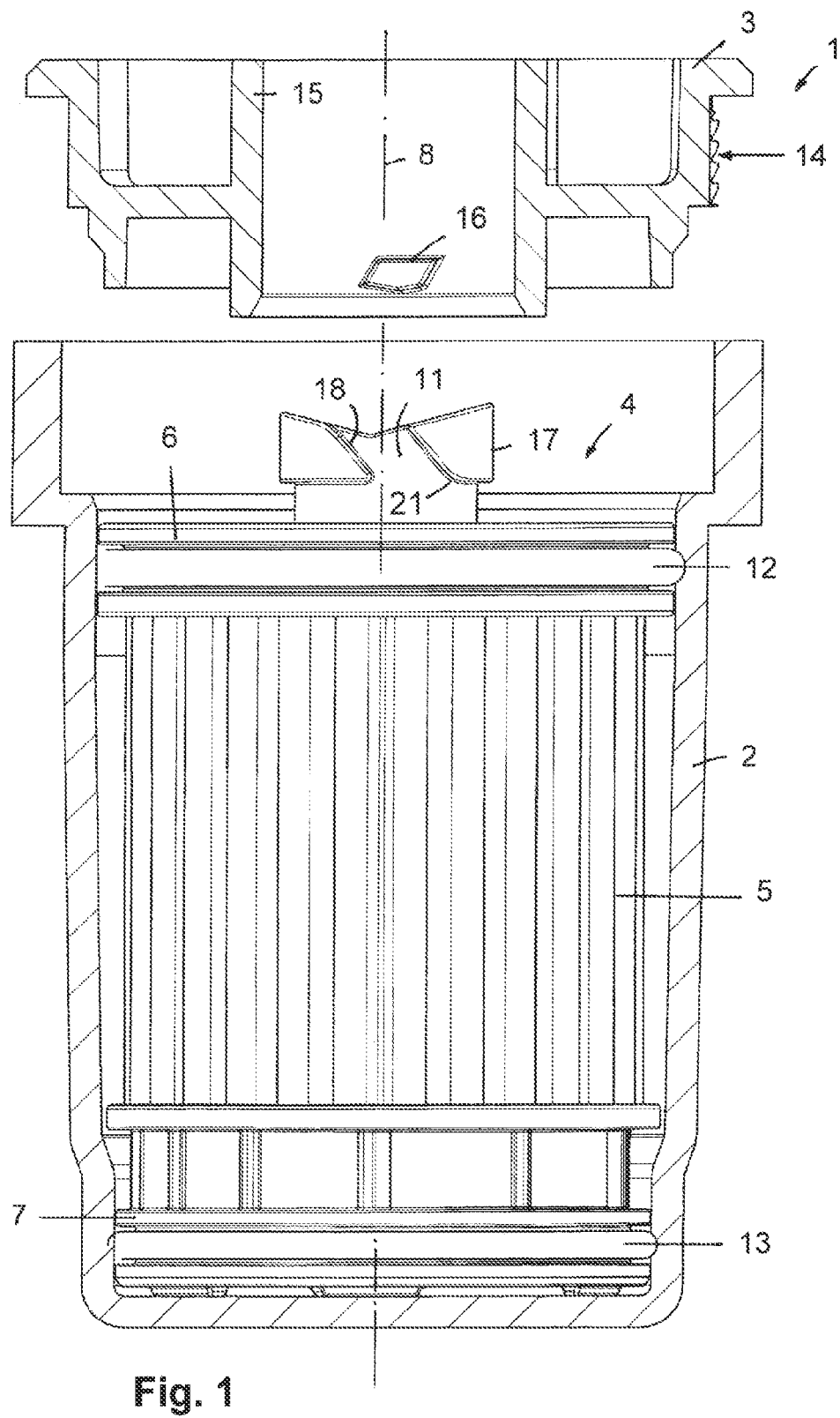
FIG. 1 shows a side view of a filter device with a filter base housing, in which a filter element is received, and with a cover attachable to the filter base housing and providing at the same time an assembly component.
Figure 2:
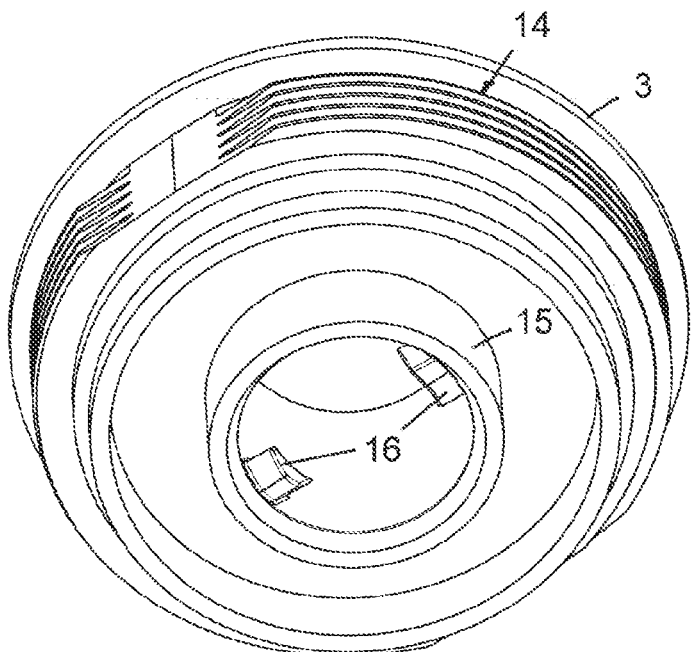
FIG. 2 shows a perspective view of the cover from below.

In the following, reference is being had to the filter device 1 illustrated in FIGS. 1, 6, and 7 in connection with the further Figures.

The filter device 1 is employed for filtration of a liquid or gaseous fluid and comprises a filter housing with a cup-shaped filter base housing 2 and a cover 3, which can be placed onto the open side of the filter base housing 2, as well as a filter element 4 which is inserted in the filter base housing 2. The filter element 4 is configured as a hollow cylindrical round filter element and comprises a filter medium body 5 as well as end face end plates 6 and 7 which are arranged at the axial end faces of the filter medium body 5 and cover them.

The filter medium body 5, in relation to the longitudinal axis 8 of the filter device 1 and of the filter element 4, is flowed through radially from the exterior to the interior. The filter medium body 5 is comprised of a folded filter material (FIG. 7). The filter medium body 5 surrounds an interior flow chamber 9 which is surrounded by a support grid 10 of the filter element 4. The filter medium body 5 is located at the outer side of the support grid 10. From the interior flow chamber 9, the purified fluid is discharged axially in upward direction. For this purpose, an axially projecting sleeve 11 providing a flow component connected to the flow chamber 9 is integrally formed at the upper end plate 6.

The upper end plate 6 as well as the end plate 7 each are provided with a circumferential annular groove in which a seal ring 12, 13 is received, respectively. In the mounted state according to FIG. 6, the seal rings 12, 13 seal-tightly rest against the inner wall of the receiving filter base housing 2.

The cover 3 of the filter housing has, on the one hand, the function of closing in the mounted state the open end face of the filter base housing 2. On the other hand, the cover 3 also has an assembly and disassembly function for the filter element 4. During assembly, the filter element 4 is inserted into the filter base housing 2 and fixed; during disassembly, the fixation is released and the filter element 4 is removed from the filter base housing 2. Accordingly, the cover 3 also forms an assembly component for the filter element 4.

The cover 3 is provided at its outer circumference with a thread 14 that can be screwed into a corresponding inner thread at the inner wall of the filter base housing 2 neighboring the opening of the filter base housing 2. The cover 3 comprises in addition a flow socket 15 which is arranged centrally in the cover 3 and can be placed on the sleeve 11. In the mounted state, the flow socket 15 is coaxial to the sleeve 11 so that the flow socket 15 and the sleeve 11 provide a common flow path for discharging the purified fluid from the interior flow chamber 9.

The sleeve 11 and the flow socket 15 enable an interlocking connection in axial direction between the end plate 6, and thus also the filter element 4, and the cover 3. The interlocking connection in axial direction permits at the same time the free rotatability of the cover 3 relative to the filter element 4. This leads to the filter element 4 being only axially lowered or lifted, but not carrying out a rotational movement, when the cover 3 is rotated into and rotated out of the filter base housing 2. Therefore, no forces in circumferential direction are acting on the outwardly positioned wall surface of the filter medium body 5.

The interlocking connection is produced by means of interlocking elements. At the inner wall of the flow socket 15, two interlocking elements 16 are provided which are diametrically opposed and project radially inwardly and have correlated therewith an interlocking counter element in the form of an interlocking collar 17 at the end face of the sleeve 11. The interlocking elements 16 at the flow socket 15 of the cover 3 and the interlocking collar 17 can be brought into an axial interlocking connection that can be released again. At the same time, the free rotatability between cover 3 and end plate 6 is maintained so that the filter element 4 in the filter base housing 2 does not perform a rotational movement about the longitudinal axis 8 when screwing in and unscrewing the cover 3. Accordingly, no forces in circumferential direction are acting on the filter medium body 5.

The interlocking collar 17 projects radially past the wall surface of the sleeve 11. As soon as the interlocking elements 16 are moved into a position axially below the interlocking collar 17, the interlocking elements 16 are held in axial direction by the interlocking collar 17.

Two diametrically opposed insertion ramps are provided in the interlocking collar 17. The insertion ramps 18 extend approximately along a straight line which is positioned at an acute angle during release or screwing in of the cover in relation to the rotational movement of the cover 3, which occurs approximately in a plane that is perpendicular to the longitudinal axis 8. The angle in the embodiment is approximately 45°. The insertion ramp 18 is oriented such that the cover 3 for insertion of the interlocking elements 16 into the insertion ramps 18 must carry out a release movement whereupon the interlocking elements 16 are moved along the insertion ramps 18 downwardly until the interlocking position is reached below the interlocking collar 17. Subsequently, the cover 3 can be screwed into the filter base housing 2.

Figure 3:
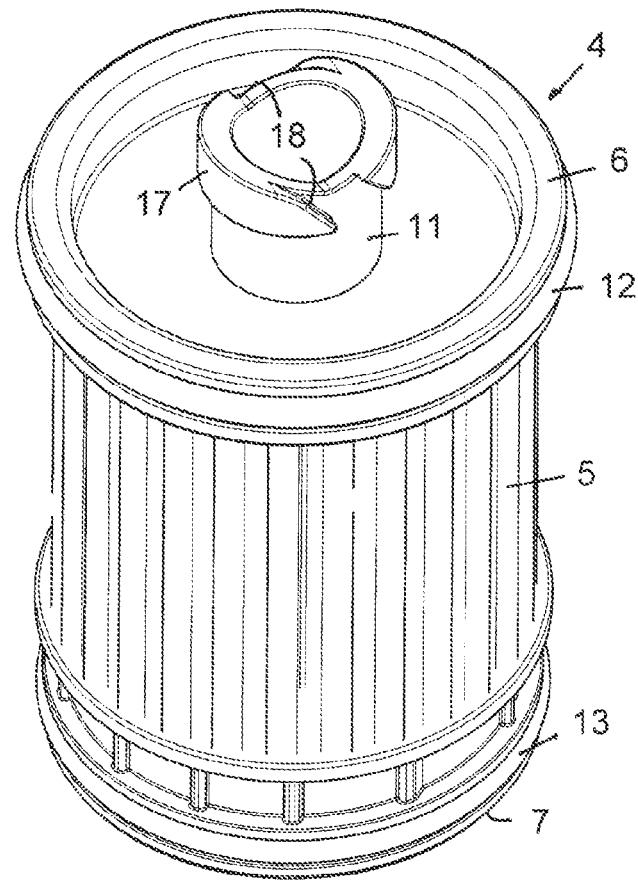
FIG. 3 shows a perspective view of the filter element from above.
Figure 4:
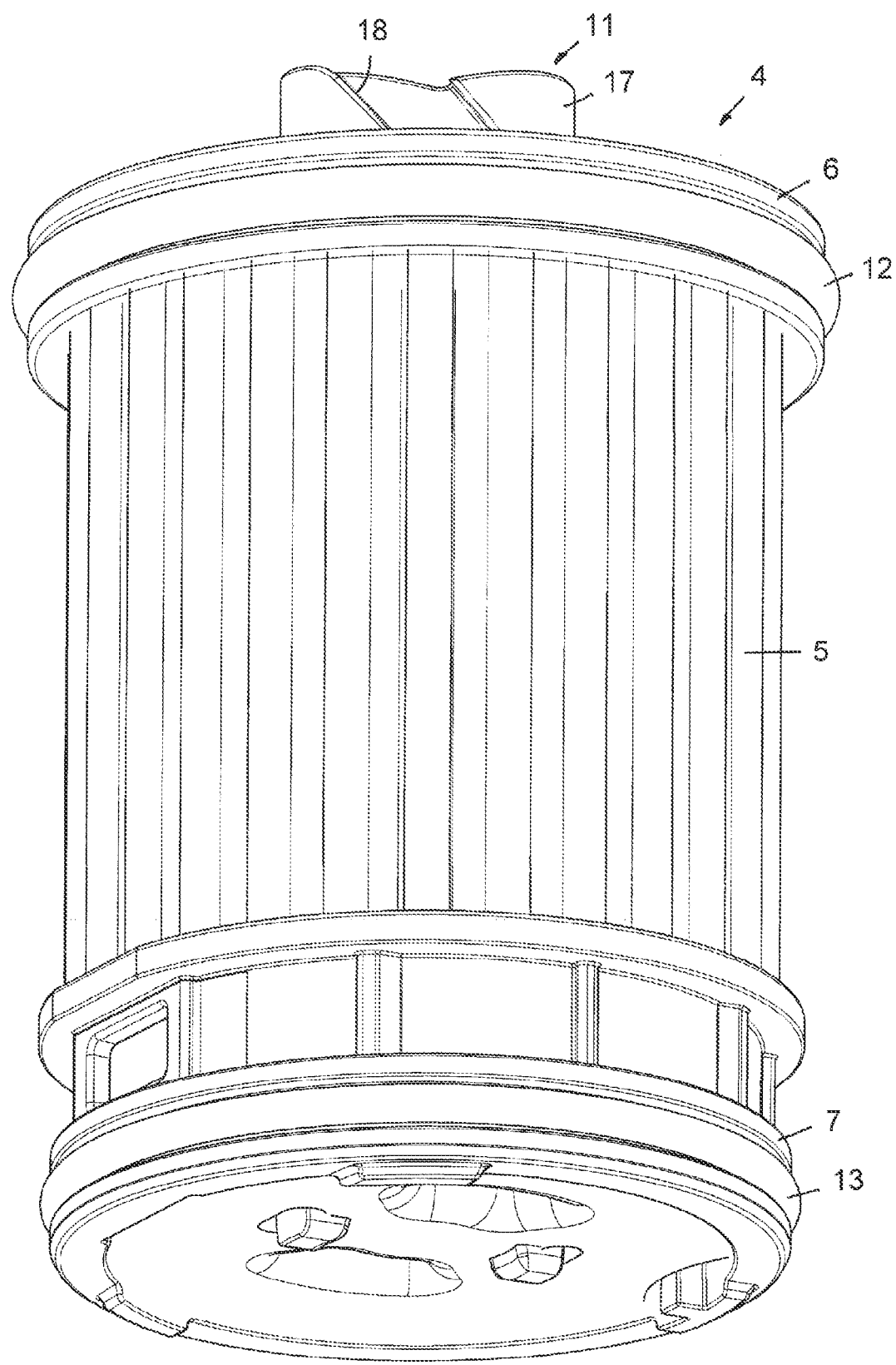
FIG. 4 shows a perspective view of the filter element from below.
Figure 5:
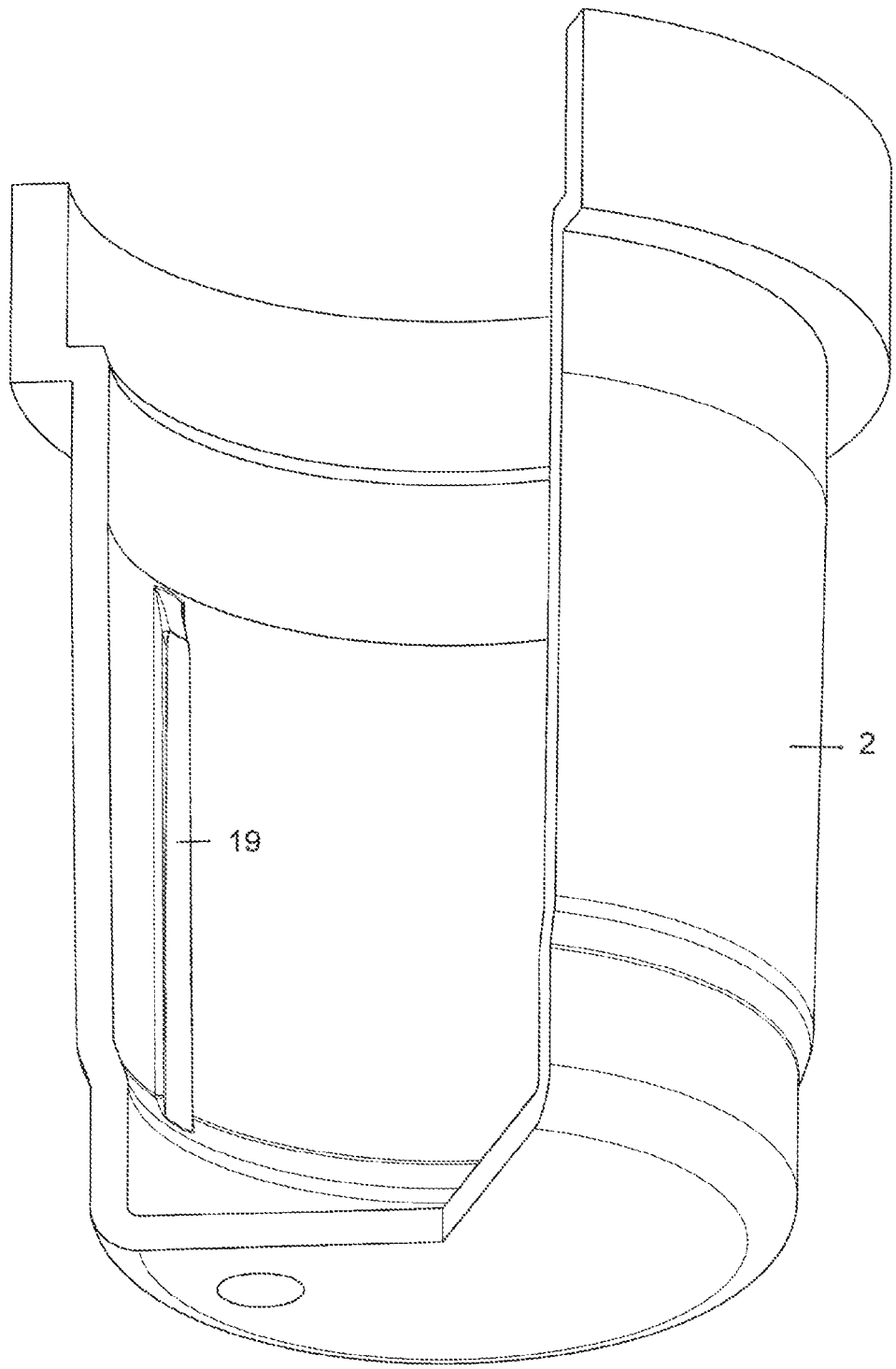
FIG. 5 shows the filter base housing, partially sectioned.

As can be seen in particular in FIG. 1 and FIG. 3, the end face of the sleeve 11 has a central recess whose lowest point is positioned at the inlet of the insertion ramps 18. In this way, the insertion of the interlocking elements 16 is facilitated.

Figure 6:
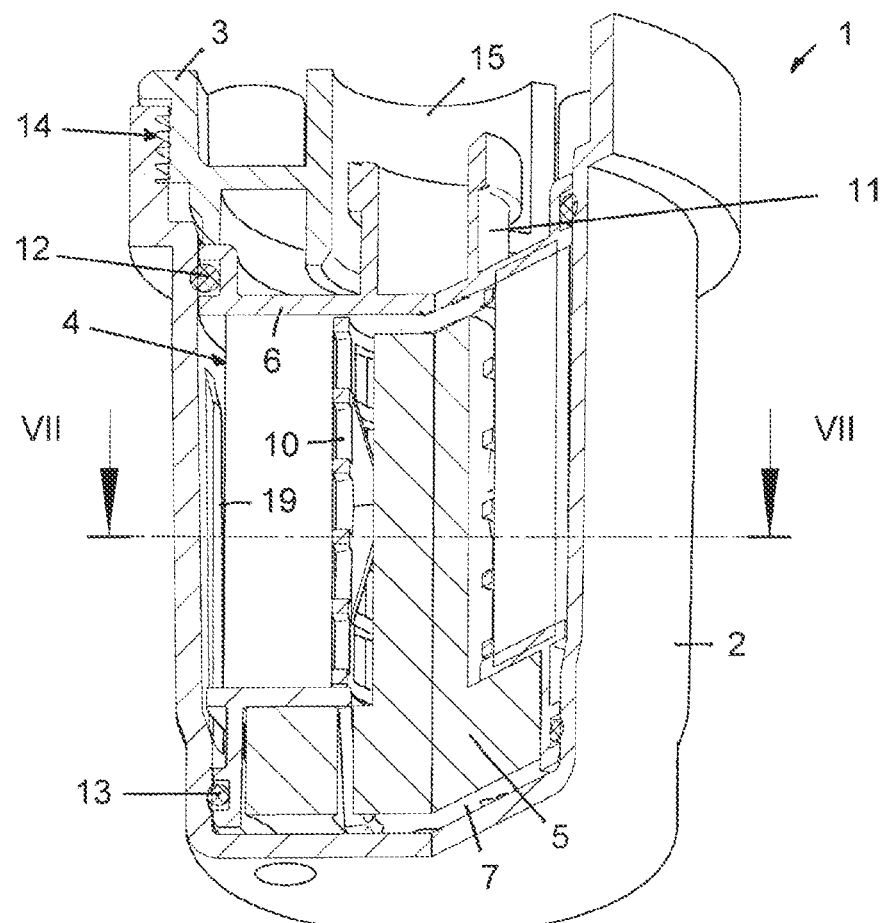
FIG. 6 shows the filter device with the filter element inside the filter base housing and attached cover, partially sectioned.
Figure 7:
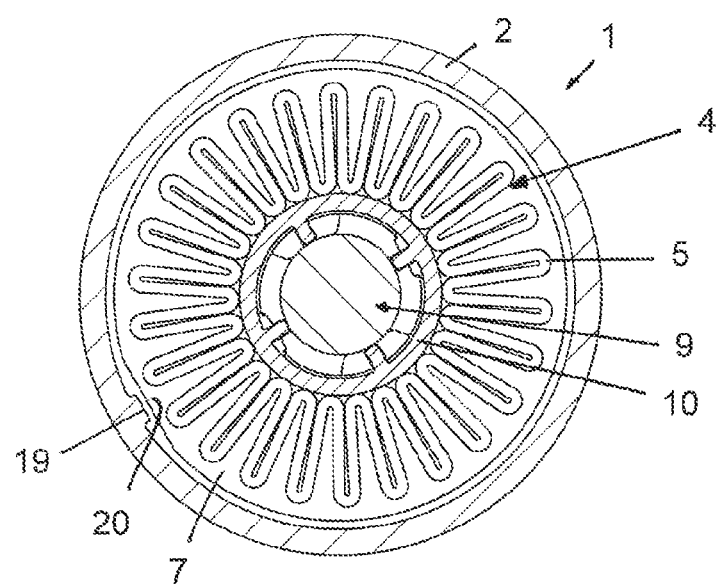
FIG. 7 shows a section according to section line VII-VII of FIG. 6.

As can be seen in FIGS. 6 and 7, an axial guide rib 19 is provided at the inner wall of the filter base housing 2. A flattened portion 20 which corresponds with the axial guide rib 19 is provided in the outer rim of the lower end plate 7. The guide rib 19 at the filter base housing 2 and the flattened portion at the lower end plate 7 enable and ensure in circumferential direction an unambiguous positioning of the filter element 4 in the filter base housing 2 and form in addition an anti-rotation device for the filter element 4 inserted into the filter base housing 2. It can be expedient to design the axial length of the guide rib 19 such that the flattened portion 20 at the end plate 7 is contacting the guide rib 19 in the inserted state of the filter element 4 in the filter base housing 2.

The upper end plate 6 comprises no such flattened portion. The axial length of the guide rib 19 is dimensioned such that the upper end plate 6 is positioned axially at a distance from the guide rib 19 in the inserted state. As an alternative, it is possible to provide a corresponding flattened portion also in the upper end plate 6 and to configure the guide rib 19 such that the flattened portions at both end plates contact the guide rib 19 in the inserted state.

Figure 8:
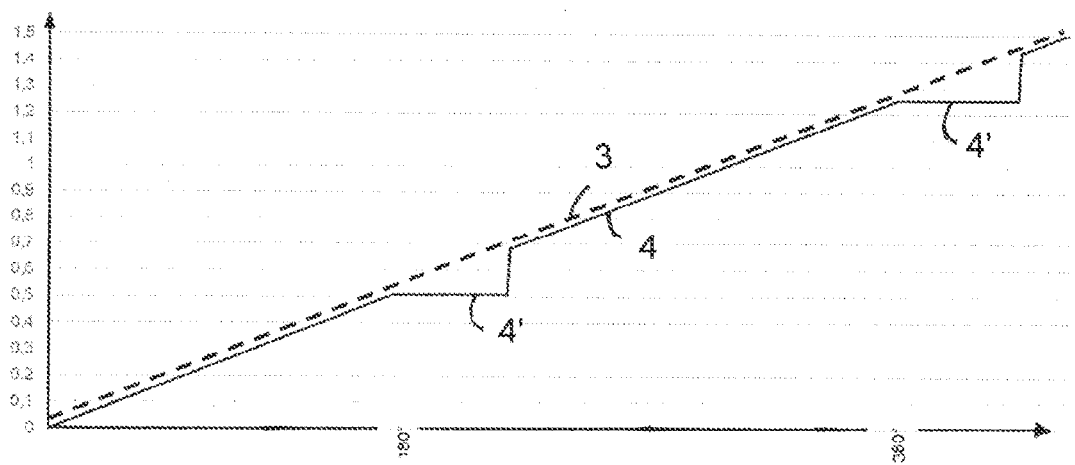
FIG. 8 shows a diagram with the axial course of the cover and of the filter element during disassembly, illustrated across a complete revolution of the cover.

In FIG. 8, a diagram with the axial course of the cover 3 and of the filter element 4 during unscrewing upon disassembly of the filter element 3 from the filter base housing 2 by means of a complete cover revolution of 360° is illustrated. The x-axis indicates the revolution of the cover 3 about the longitudinal axis in degrees, the y-axis the axially increasing distance of cover 3 and filter element 4 from the filter base housing 2 in accordance with the thread pitch of the thread 14 at the cover 3. The dashed course indicates the axial distance of the cover 3, the solid course the axial distance of the filter element 4.

While the axial course of the cover 3, following the thread pitch, is embodied constant and continuous, there are two stages 4' located at the level of the diametrically opposed insertion ramps 18 in the axial course of the filter element 4. As the interlocking element 16 moves in circumferential direction below the interlocking collar 17, the interlocking element 16 moves axially some distance into the insertion ramp 18 whereby the axial unscrewing of the cover 3 is compensated. The interlocking element 16 moves out of the insertion ramp 18 again upon further rotation of the cover 3 and continues to move below the interlocking collar 17; in this phase, the cover 3 and the filter element 4 perform the same axial movement.

At a wall section that delimits the insertion ramp 18, at the transition to the bottom side of the interlocking collar 17, a rounded portion 21 (FIG. 1) is provided that facilitates moving of the interlocking element 16 out of the insertion ramp 18.

What is claimed is:

1. A filter device comprising:
    a filter element configured to filter a liquid or a gaseous fluid, wherein the filter element comprises a filter medium body surrounding an interior flow chamber and further comprises a first end plate, wherein the first end plate, in relation to a longitudinal axis of the filter medium body, is arranged at an end face of the filter medium body;
    a filter base housing configured to receive the filter element;
    an assembly component for assembly and disassembly of the filter element in the filter base housing, wherein the assembly component is configured to connect to the first end plate and to the filter base housing by a rotational movement about the longitudinal axis;
    wherein the assembly component comprises one or more interlocking elements;
    an interlocking counter element arranged at the first end plate or at a component at the first end plate;
    wherein the one or more interlocking elements are configured to be brought into an axial interlocking connection with the interlocking counter element, while enabling at the same time a free rotatability in a rotational direction about the longitudinal axis;
    wherein the interlocking counter element is a circumferentially extending interlocking collar comprising one or more slotted guide-shaped insertion ramps for insertion of the one or more interlocking elements.

2. The filter device according to claim 1, wherein the assembly component forms a cover covering in an assembled position an open side of the filter base housing.

3. The filter device according to claim 1, wherein the assembly component and the filter base housing each are provided with a thread configured to be screwed into each other.

4. The filter device according to claim 1, wherein the first end plate comprises an integrally formed, axially projecting sleeve, wherein the circumferentially extending interlocking collar is formed as a radially projecting collar at the integrally formed, axially projecting sleeve.

5. The filter device according to claim 4, wherein the integrally formed, axially projecting sleeve forms a flow component connected in fluid communication to the interior flow chamber in the filter medium body.

6. The filter device according to claim 4, wherein the circumferentially extending interlocking collar comprises two of said one or more insertion ramps arranged diametrically opposite each other.

7. The filter device according to claim 4, wherein the assembly component comprises an axially extending flow socket configured to be placed on the integrally formed, axially projecting sleeve, wherein the one or more interlocking elements are arranged at a wall of the flow socket.

8. The filter device according to claim 1, wherein the one or more insertion ramps are oriented along a straight line and the straight line is positioned at an acute angle relative to a rotational movement of the assembly component.

9. The filter device according to claim 1, wherein a transition of a wall section delimiting the one or more insertion ramps, respectively, is rounded toward a bottom side of the circumferentially extending interlocking collar.

10. The filter device according to claim 1, wherein the filter base housing comprises an axial guide rib arranged at an inner wall of the filter base housing.

11. The filter device according to claim 10, wherein the filter element comprises a second end plate arranged opposite the first end plate and comprising a flattened portion arranged in an outer edge of the second end plate so as to correspond with the axial guide rib.

12. The filter device according to claim 10, wherein the first end plate comprises a flattened portion arranged in an outer edge of the first end plate so as to correspond with the axial guide rib.

* * * * *